United States Patent
Stockwell et al.

(10) Patent No.: US 11,833,757 B2
(45) Date of Patent: Dec. 5, 2023

(54) MANUFACTURING SYSTEM AND METHOD FOR HIGH PERFORMANCE CUSTOMIZED ARTICLES

(71) Applicant: 3D Systems, Inc., Rock Hill, SC (US)

(72) Inventors: John Stockwell, Sylmar, CA (US);
Pingyong Xu, Valencia, CA (US);
Peter Scott Turner, Venice, CA (US);
Charles W. Hull, Santa Clarita, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/720,355

(22) Filed: Apr. 14, 2022

(65) Prior Publication Data
US 2022/0339873 A1    Oct. 27, 2022

Related U.S. Application Data

(60) Provisional application No. 63/178,145, filed on Apr. 22, 2021.

(51) Int. Cl.
*B29C 64/364* (2017.01)
*B29C 64/124* (2017.01)
(Continued)

(52) U.S. Cl.
CPC .......... *B29C 64/364* (2017.08); *B29C 64/124* (2017.08); *B29C 64/393* (2017.08);
(Continued)

(58) Field of Classification Search
CPC ... B29C 64/364; B29C 64/124; B29C 64/393; B29C 64/245; B29C 64/25;
(Continued)

(56) References Cited

U.S. PATENT DOCUMENTS

| 10,155,882 B2 | 12/2018 | Rolland et al. |
| 10,232,605 B2 | 3/2019 | Desimore et al. |

(Continued)

FOREIGN PATENT DOCUMENTS

| WO | 2012150497 A1 | 8/2012 |
| WO | WO-2018097954 A1 * | 5/2018 |
| WO | 2021004064 A1 | 1/2021 |

OTHER PUBLICATIONS

PCT International Search Report for PCT Application No. PCT/US2022/024723, dated Jul. 19, 2022 (5 pages).
(Continued)

*Primary Examiner* — Joseph S Del Sole
*Assistant Examiner* — Baileigh Kate Darnell

(57) ABSTRACT

A three-dimensional (3D) printing system for manufacturing a 3D article includes a resin vessel, a build tray, a movement mechanism, a light engine, a housing, a gas handling system, and a controller. The resin vessel includes a transparent sheet on a lower side. The housing defines two chambers including an upper chamber and a lower chamber. The upper chamber is in fluidic communication with the resin contained by the resin vessel. The lower chamber is in fluid communication with a lower surface of the transparent sheet. The controller is configured to (a) operate the gas handling system to reduce and control a partial pressure of oxygen in the upper and lower chambers, (b) operate the movement mechanism and the light engine to form the 3D article in a layer-by-layer manner.

12 Claims, 2 Drawing Sheets

(51) Int. Cl.
    *B29C 64/393*     (2017.01)
    *B33Y 10/00*     (2015.01)
    *B33Y 30/00*     (2015.01)
    *B33Y 40/00*     (2020.01)
    *B33Y 50/02*     (2015.01)
    *B29C 64/25*     (2017.01)

(52) U.S. Cl.
    CPC ............... *B33Y 10/00* (2014.12); *B33Y 30/00* (2014.12); *B33Y 40/00* (2014.12); *B33Y 50/02* (2014.12)

(58) Field of Classification Search
    CPC ....... B29C 64/255; B33Y 10/00; B33Y 30/00; B33Y 40/00; B33Y 50/02
    See application file for complete search history.

(56) References Cited

U.S. PATENT DOCUMENTS

| | | |
|---|---|---|
| 2016/0303795 A1 | 10/2016 | Liu et al. |
| 2018/0065302 A1* | 3/2018 | Arai ..................... B29C 64/245 |
| 2018/0067393 A1 | 3/2018 | Weitekamp |
| 2020/0094468 A1 | 3/2020 | Feller et al. |
| 2020/0247051 A1* | 8/2020 | Jau ....................... B29C 64/264 |
| 2021/0163676 A1 | 6/2021 | Balasubramanian et al. |

OTHER PUBLICATIONS

PCT Written Opinion for PCT Application No. PCT/US2022/024723, dated Jul. 19, 2022 (7 pages).

* cited by examiner

MANUFACTURING SYSTEM AND METHOD FOR HIGH PERFORMANCE CUSTOMIZED ARTICLES

CROSS-REFERENCE TO RELATED APPLICATIONS

This non-provisional patent application claims priority to U.S. Provisional Application Ser. No. 63/178,145, Entitled "Manufacturing System and Method for High Performance Customized Articles" by John Stockwell et al., filed on Apr. 22, 2021, incorporated herein by reference under the benefit of U.S.C. 119(e).

FIELD OF THE INVENTION

The present disclosure concerns an apparatus and method for fabrication of solid three dimensional (3D) articles of manufacture from radiation curable materials. More particularly, the present disclosure concerns a system and method of producing very high performance plastic articles compared to what has been possible previously with layer-by-layer stereolithography processes.

BACKGROUND

Three dimensional (3D) printers are in rapidly increasing use for manufacturing customized articles. One class of 3D printers includes stereolithography printers having a general principle of operation including the selective curing and hardening of radiation curable (i.e., photocurable) liquid resins. One type of stereolithography system includes a containment vessel holding the curable resin, a movement mechanism coupled to a support tray, and a light engine. The stereolithography system forms a three dimensional (3D) article of manufacture by selectively curing layers of the photocurable resin onto a lower surface of the support tray. There is a desire to produce customized articles with very high strengths for physically demanding applications like forming gears for a high performance gear train (e.g., a gear train in a tractor or transportation vehicle). Plastics conventionally produced by prior stereolithography processes do not meet such stringent requirements.

SUMMARY

Figure 1:
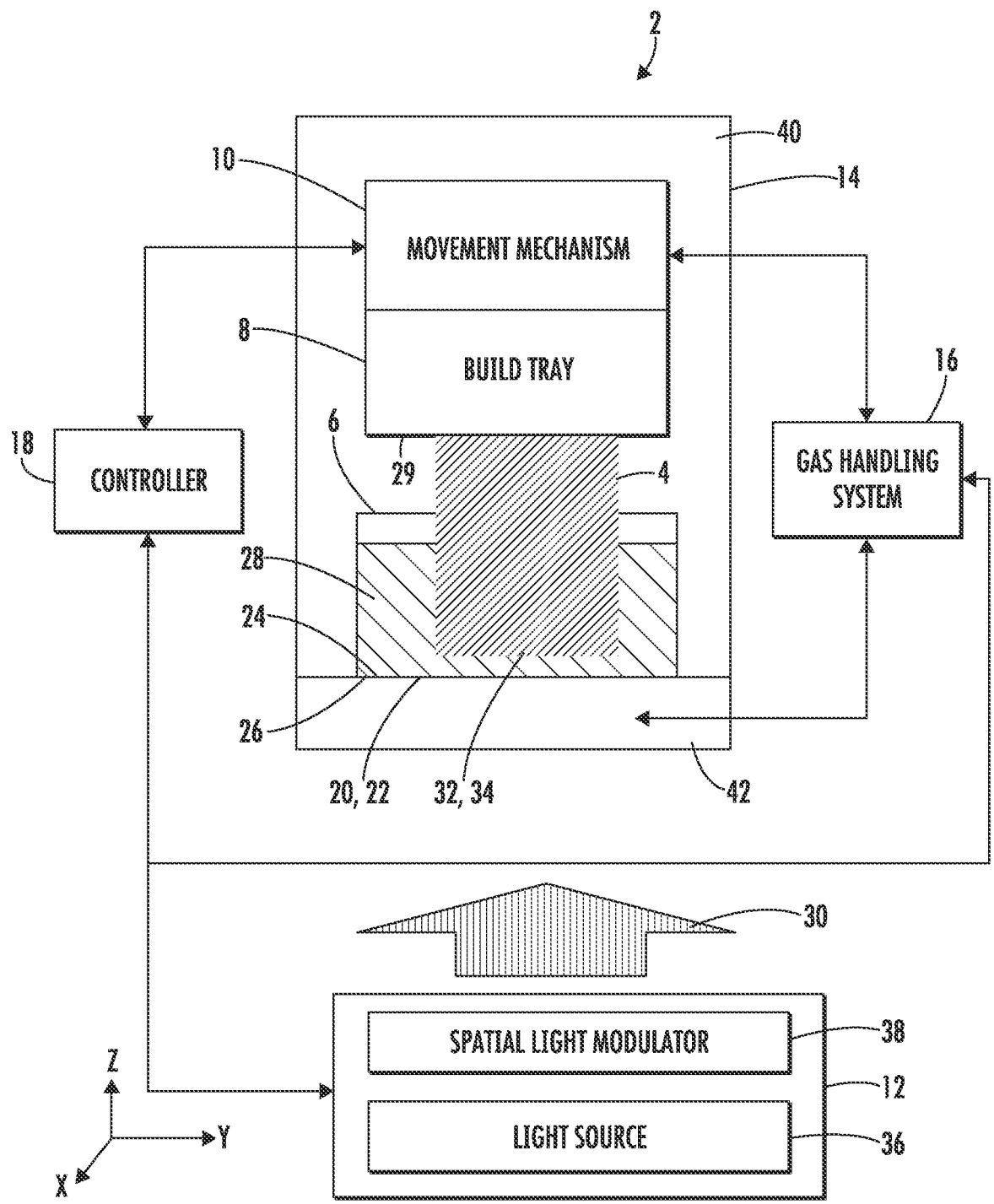
FIG. 1 is a schematic diagram depicting an embodiment of a three-dimensional printing system.

In a first aspect of the disclosure, a three-dimensional (3D) printing system is configured to manufacture a high performance plastic 3D article. The 3D printing system includes a resin vessel, a build tray, a movement mechanism, a light engine, a housing, a gas handling system, and a controller. The resin vessel includes a transparent sheet on a lower side. The transparent sheet has opposed upper and lower surfaces. The resin vessel is configured to contain photocurable resin in contact with the upper surface of the transparent sheet. The build tray has a lower surface configured to support the 3D article. The movement mechanism is coupled to the build tray and is configured to selectively and vertically position the build tray. The light engine is configured to transmit modulated radiation up through the transparent sheet to a build plane within the resin above the transparent sheet. The housing defines two chambers including an upper chamber and a lower chamber. The upper chamber is in fluidic communication with the resin contained by the resin vessel. The lower chamber is in fluid communication with the lower surface of the transparent sheet. The gas handling system is fluidically coupled to the upper chamber and to the lower chamber. The controller is configured to (1) operate the gas handling system to reduce and control a partial pressure of oxygen in the upper and lower chambers with a first partial pressure of oxygen in the upper chamber and a second partial pressure of oxygen in the lower chamber, the second partial pressure is greater than the first partial pressure, (2) operate the movement mechanism to position the lower surface of the build tray (or 3D article) at the build plane, (3) operate the light engine to selectively polymerize a layer of the photocurable resin over the lower surface, and (4) repeat (2) and (3) until the 3D article is formed.

The greater second partial pressure of oxygen in the lower chamber enables oxygen to diffuse through the transparent sheet to prevent hardening of resin upon the upper surface of the transparent sheet. The first and second partial pressures are less than an ambient partial pressure of oxygen so as to accelerate or increase polymerization or cross-linking and hardening of the photocurable resin during formation of the 3D article.

In one implementation, the second partial pressure is at least twice that of the first partial pressure. The first partial pressure in the upper chamber can be less than 0.02 atmosphere or less than 0.01 atmosphere or less than 0.005 atmosphere or less than 0.002 atmosphere or 0.001 atmosphere or less. The second partial pressure can be less than 0.05 atmosphere or in a range of 0.02 to 0.05 atmosphere.

In another implementation, the photocurable resin includes a cyclic olefin and a catalyst. The catalyst can include two different catalysts. The catalyst can be a transition metal catalyst and is at least partly based upon one or more of W, Mo, Re, Ru, and Ti. The photocurable resin, under cure conditions, is configured to polymerize with an olefin metathesis reaction. More particularly, the photocurable resin is configured to polymerize with a ring opening metathesis polymerization (ROMP). The atmospheric control in the upper and lower chambers (control of reduced oxygen partial pressure) enables the ROMP polymerization to be particularly effective and to produce high modulus and strength articles.

In yet another implementation, the photocurable resin includes an acrylate-based monomer and a catalyst. The photocurable resin can include other components such as fillers and/or colorants.

In a second aspect of the disclosure a method of manufacturing a three-dimensional (3D) article includes providing and operating a three-dimensional printing system. The provided system includes a resin vessel, a build tray, a movement mechanism, a light engine, a housing, and a gas handling system. The resin vessel includes a transparent sheet on a lower side. The transparent sheet has opposed upper and lower surfaces. The resin vessel is configured to contain photocurable resin in contact with the upper surface of the transparent sheet. The build tray has a lower surface configured to support the 3D article. The movement mechanism is coupled to the build tray and is configured to selectively and vertically position the build tray. The light engine is configured to transmit modulated radiation up through the transparent sheet to a build plane within the resin above the transparent sheet. The housing defines two chambers including an upper chamber and a lower chamber. The upper chamber is in fluidic communication with the resin contained by the resin vessel. The lower chamber is in fluid communication with the lower surface of the transparent sheet. The gas handling system is fluidically coupled to the upper chamber and to the lower chamber. The method, performed at least partly by a controller, includes (a) operating the gas handling system to reduce and control a partial pressure of the oxygen in the upper and lower chambers with a first partial pressure of oxygen in the upper chamber and a second partial pressure of oxygen in the lower chamber, the second partial pressure is greater than the first partial pressure, (b) the movement mechanism to position the lower surface of the build tray at the build plane, (c) operating the light engine to selectively polymerize a layer of the photocurable resin over the lower surface, and (d) repeating operation of the movement mechanism and light engine until the 3D article is formed.

In a third aspect of the disclosure, a non-transient storage system stores instructions for a 3D printing system. The 3D printing system includes a resin vessel, a build tray, a movement mechanism, a light engine, a housing, a gas handling system, and a controller. The resin vessel includes a transparent sheet on a lower side. The transparent sheet has opposed upper and lower surfaces. The resin vessel is configured to contain photocurable resin in contact with the upper surface of the transparent sheet. The build tray has a lower surface configured to support the 3D article. The movement mechanism is coupled to the build tray and is configured to selectively and vertically position the build tray. The light engine is configured to transmit modulated radiation up through the transparent sheet to a build plane within the resin above the transparent sheet. The housing defines two chambers including an upper chamber and a lower chamber. The upper chamber is in fluidic communication with the resin contained by the resin vessel. The lower chamber is in fluid communication with the lower surface of the transparent sheet. The gas handling system is fluidically coupled to the upper chamber and to the lower chamber. In response to execution by a processor the software instructions cause the controller to: (a) operate the gas handling system to reduce and control a partial pressure of the oxygen in the upper and lower chambers with a first partial pressure of oxygen in the upper chamber and a second partial pressure of oxygen in the lower chamber, the second partial pressure is greater than the first partial pressure, (b) operate the movement mechanism to position the lower surface of the build tray at the build plane, (c) operate the light engine to selectively polymerize a layer of the photocurable resin over the lower surface, and (d) repeating operation of the movement mechanism and light engine until the 3D article is formed.

DETAILED DESCRIPTION OF THE PREFERRED EMBODIMENTS

FIG. 1 is a schematic diagram of a three-dimensional (3D) printing system 2 for manufacturing a 3D article 4. The disclosed 3D printing system 2 includes a resin vessel 6, a build tray 8, a movement mechanism 10, a light engine 12, a housing 14, a gas handling system 16, and a controller 18. The 3D printing system 2 operates by solidifying polymer layers onto the build tray 8.

The resin vessel 6 includes a transparent sheet 20 on a lower side 22. The transparent sheet 20 has opposed upper 24 and lower 26 sides. The resin vessel is configured to contain photocurable resin 28 in contact with the upper side 24 of the transparent sheet 20.

In an illustrative embodiment, the transparent sheet 20 is semipermeable. The transparent sheet 20 can transmit an inhibitor such as oxygen by diffusion from the lower side 26 to the upper side 24. The transparent sheet 20 is a flexible polymer sheet having a chemical resistance to the photocurable resin 28 while allowing the transmission of oxygen as an inhibitor from the lower side 26 to the upper side 24 of the transparent sheet 20. The transparent sheet 20 is generally transparent to ultraviolet (UV), violet, or blue light. The transparent sheet 20 may include one or more polymers such as polyvinylidene fluoride (PVDF), ethylenchlorotrifluoroethylene (ECTFE), ethyl enetetrafluoroethylene (ETFE), polytetrafluoroethylene (PTFE), perfluoroalkoxy (PFA), fluorinated ethylene propylene (FEP), polyvinylidene fluoride (PVDF) or other materials known in the art. The transparent sheet 20 can include amorphous thermoplastic fluoropolymer films such as TEFLON AF 1600™ (trademark of Chemours Company of Wilmington, DE) or TEFLON AF 2400™. Other materials are possible. In an illustrative embodiment, the transparent sheet 20 can have a thickness of about 80 microns (one thousand microns equals one millimeter) although other thicknesses are possible.

The build tray 8 is coupled to a movement mechanism 10. The movement mechanism 10 is a motorized device for vertically positioning the build tray 8 and outputting an encoder signal that is indicative of a vertical position of the build tray 8. In an illustrative embodiment, the movement mechanism 10 includes a vertically fixed portion and a vertically moving portion. The vertically moving portion supports the build tray and includes a threaded bearing. The vertically fixed portion includes a motor coupled to a lead screw which is received within the threaded bearing. As the motor rotates the lead screw, the action upon the threaded bearing translates the build tray up or down, depending upon the rotational direction of the lead screw. The encoder can be a linear or rotational encoder and outputs a signal by which the controller 18 can determine and monitor a vertical position of the build tray 8 and hence by inference a lower face 29 of the build tray 8.

The light engine 12 is configured to transmit or project pixelated radiation 30 up through the transparent sheet 20 to a build plane 32 which at a lower face 34 of the 3D article 4. In an illustrative embodiment, the light engine 12 includes a light source 36 and a spatial light modulator 38. The light source 36 can include an array of ultraviolet (UV) light-emitting diodes. The spatial light modulator 38 can include a micromirror array with more than a million mirror elements. The mirror elements individually correspond to pixels over the build plane 32.

The housing 14 defines two chambers 40, 42 including an upper chamber 40 and a lower chamber 42. The two chambers 40, 42 are fluidically isolated from an environmental atmosphere and from each other. The upper chamber 40 is in fluid communication with the photocurable resin 28 in the resin vessel 6. The lower chamber 42 is in fluid communication with the lower side 22 of the transparent sheet 20.

The gas handling system 16 is individually and fluidically coupled to the upper chamber 40 and the lower chamber 42. The gas handling system 16 is configured to controllably reduce a partial pressure of oxygen in the upper chamber 20 and lower chamber 42. The partial pressure of oxygen in the upper chamber 40 is lower than the partial pressure of oxygen in the lower chamber 42. Reducing the partial pressure of oxygen can be performed by reducing a gauge pressure by applying a vacuum and/or pumping a non-oxidizing or inert gas into the chambers 40 and 42. In an illustrative embodiment, the gas handling system includes a nitrogen generator or nitrogen canister (pressurized bottle) and is configured to pump the nitrogen into the chambers 40 and 42 to increase a molar ratio of nitrogen to oxygen while an outlet pressure valve (not shown) allows the pressure to equalize with a localized ambient pressure (ambient meaning outside but in an immediate environment of the housing 14). While FIG. 1 illustrates the gas handling system 16 as a single system, the gas handling system 16 can include two independent gas handling systems with one being for the upper chamber 40 and one being for the lower chamber 42. Not shown are oxygen sensors that can be used to monitor the partial pressure of oxygen in the chambers 40 and 42 and to feed data indicative of the oxygen partial pressure to the controller 18. Then the controller 18 can control the oxygen partial pressure in a closed loop control manner.

The controller 18 is coupled to the movement mechanism 10, the light engine 12, and the gas handling system 16 (including sensors and encoders). The controller 18 includes a non-transient information storage system (e.g., a nonvolatile memory and/or a disc drive) and a processor. The non-transient information storage system stores software instructions. When executed by the processor, the software instructions cause the controller 18 to control various portions of the 3D printing system 2 including the movement mechanism 10, the light engine 12, and the gas handling system 16.

Thus, by the processor executing the software instructions, the controller is configured to: (1) operate the gas handling system to reduce, modulate, vary and/or control a partial pressure of oxygen in the upper and lower chambers, (2) operate the movement mechanism to position the lower face 29 of the build tray (or the lower face 34 of the 3D article) at the build plane 32, (3) operate the light engine to selectively polymerize a layer of the photocurable resin over the lower surface 29 or 34, and (4) repeat (2) and (3) until the 3D article 4 is formed. More details on the overall process follow.

The photocurable resin 28 can be any resin that can be selectively cured and hardened in a layer-by-layer manner using selectively applied radiation. In an illustrative embodiment, the radiation is ultraviolet (UV) radiation. The photocurable resin 28 includes a monomer and a catalyst. In an illustrative example, the monomer includes an olefin or alkene monomer. During the selective curing or polymerization process, an olefin metathesis reaction occurs. More particularly, this polymerization is referred to as a ring opening metathesis polymerization (ROMP). The catalyst includes two different catalysts. The catalysts are at least partly based upon transition metals such as W, Mo, Re, Ru, and Ti.

In an alternative embodiment, the photocurable resin 28 can be an acrylate resin (e.g., based on acrylic acid). Such as photocurable resin 28 would also include other functional components including a catalyst. Such photocurable resins are known in the art for 3D printing and stereolithography.

Figure 2:
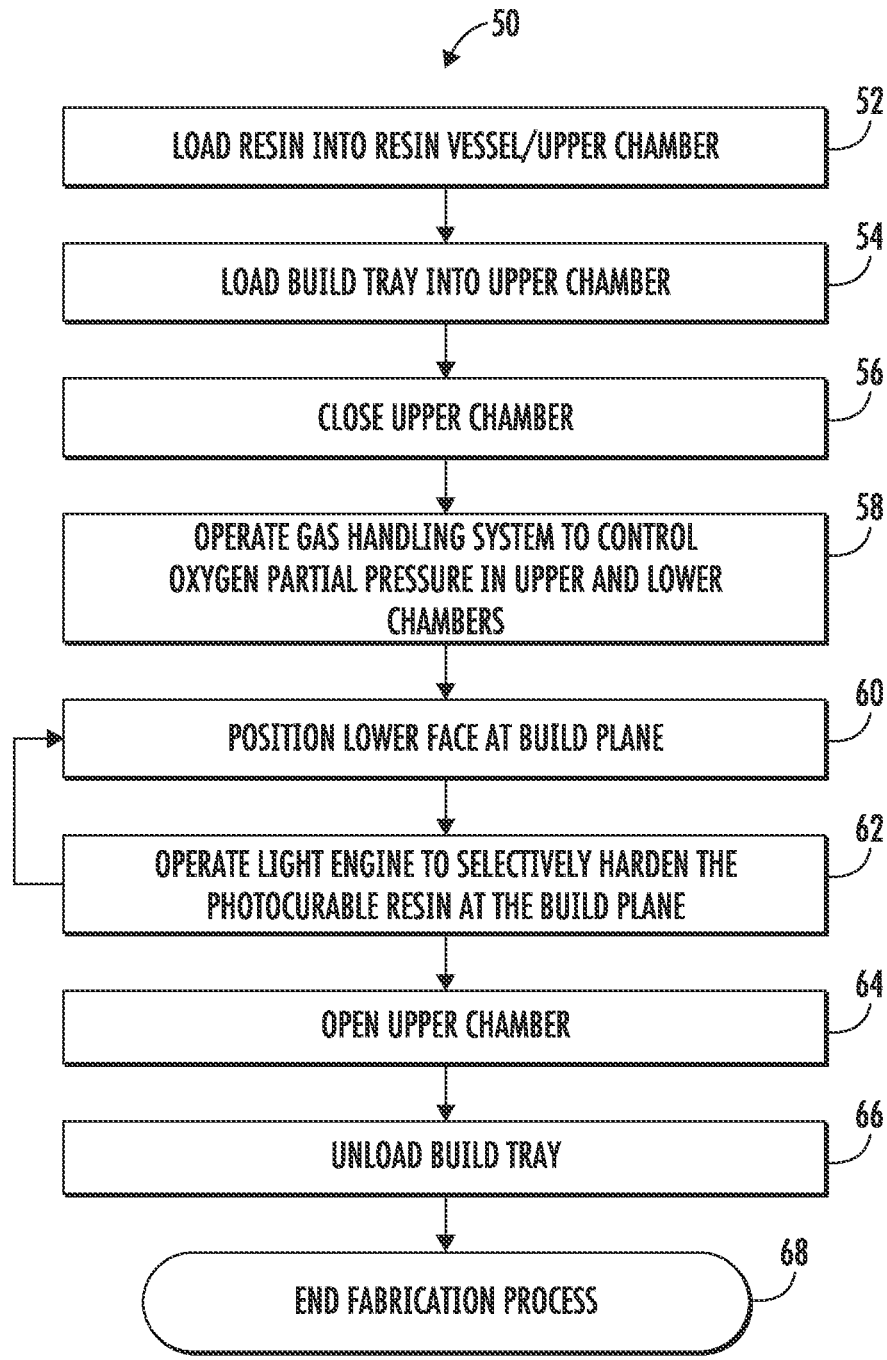
FIG. 2 is a process flowchart depicting an embodiment of a method for manufacturing a high performance plastic article.

FIG. 2 is a process flowchart depicting an embodiment of a method 50 of manufacturing a high strength 3D article 4. At least some or all of the steps of method 50 can be performed by the controller 18 although some may alternatively be manually performed. Any or all such variations are anticipated.

According to 52, the photocurable resin 28 is loaded into the resin vessel 6 and upper chamber 40. (The resin vessel is positioned within the upper chamber 40). According to 54, the build tray 8 is loaded into the upper chamber 40 and coupled to the movement mechanism 10. According to 56, the upper chamber 40 is closed or sealed from an ambient or outside atmosphere.

According to 58, the gas handling system 16 is operated to reduce a partial pressure of oxygen in the upper chamber 40 and the lower chamber 42. An ambient atmosphere at sea level has a molar ratio of 21% oxygen which corresponds to about a 0.21 atmosphere partial pressure of oxygen. During step 58, the partial pressure of oxygen in the upper chamber 40 is lowered to a first partial pressure and the partial pressure of oxygen in the lower chamber 42 is lowered to a second partial pressure. The second partial pressure is at least twice the first partial pressure to assure that the photocurable resin 28 is not hardened on the lower side 26 of the transparent sheet 20.

According to 58, the partial pressure of oxygen in the upper chamber 40 is reduced to less than 0.02 atmosphere or less than 0.01 atmosphere or less than 0.005 atmosphere or less than 0.002 atmosphere or less than 0.001 atmosphere. The lower partial pressures are better because the oxygen will act as an inhibitor that inhibits a full extent of polymerization or cross-linking of the photocurable resin 28 during operation of the light engine 12. For example, the low partial pressure is important in a ROMP process resulting in very a very high strength polymer 3D article 4.

Also according to 58, the partial pressure in the lower chamber 42 is reduced to less than 0.05 atmosphere or in a range of 0.05 to 0.02 atmosphere. Some partial pressure of oxygen in the lower chamber 42 is required to inhibit or quench polymerization at the upper side 24 of the transparent sheet 20. However, the partial pressure of ambient air will also inhibit polymerization at the build plane 32. The partial pressure of oxygen is held within a controlled range that is above the partial pressure of chamber 40. The controlled range assures that polymerization at the build plane 32 is high enough to provide a high strength article 4 while also preventing hardening of resin upon the upper side 24 of the transparent sheet 20. The partial pressure of oxygen in the lower chamber 42 is a function of a thickness and oxygen permeability of the transparent sheet 20. A thinner and more permeable transparent sheet 20 will require a lower partial pressure of oxygen in the lower chamber 42. Conversely, a thicker and less permeable transparent sheet 20 will require a higher partial pressure of oxygen in the lower chamber 42.

According to 60, the lower face 29 of build tray 8 (and later the lower face 34 of the 3D article 4) is positioned at the build plane 32. According to 62, the light engine 12 is operated to selectively harden the photocurable resin 28 at the build plane 32.

Steps 60 and 62 are repeated until fabrication of the 3D article 4 is complete. According to 64, the upper chamber 40 is opened to allow removal of the build tray according to 66. The fabrication or manufacturing process is ended according to 68.

The unique combination of the system 2, the method 50, and the ROMP polymerization results in exceptionally high modulus and high strength articles 4. In an alternative embodiment, an acrylate photocurable resin 28 is used. The method 50 then can result in a more rapid and complete curing of the photocurable resin 28 than would otherwise be possible.

The specific embodiments and applications thereof described above are for illustrative purposes only and do not preclude modifications and variations encompassed by the scope of the following claims.

What is claimed:

1. A three-dimensional (3D) printing system for manufacturing a 3D article comprising:
   a resin vessel including a transparent sheet on a lower side, the transparent sheet having opposed upper and lower surfaces, the resin vessel configured to contain photocurable resin in contact with the upper surface of the transparent sheet;
   a build tray having a lower surface configured to support the 3D article;
   a movement mechanism configured to selectively and vertically position the build tray;
   a light engine configured to transmit modulated radiation up through the transparent sheet to a build plane within the resin above the transparent sheet;
   a housing that defines two chambers that are fluidically isolated from each other and closed and sealed from a surrounding atmosphere including:
      an upper chamber that is in fluidic communication with the resin contained by the resin vessel; and
      a lower chamber that is in fluid communication with the lower surface of the transparent sheet;
   a gas handling system fluidically coupled to the upper chamber and to the lower chamber;
   a controller configured to:
      (1) operate the gas handling system to reduce and control a partial pressure of oxygen in the upper and lower chambers with a first partial pressure of oxygen in the upper chamber and a second partial pressure of oxygen in the lower chamber, the second partial pressure is greater than the first partial pressure;
      (2) operate the movement mechanism to position the lower surface of the build tray at the build plane;
      (3) operate the light engine to selectively polymerize a layer of the photocurable resin over the lower surface; and
      (4) repeat (2) and (3) until the 3D article is formed.

2. The three-dimensional (3D) printing system of claim 1 wherein the second partial pressure is at least twice that of the first partial pressure.

3. The three-dimensional (3D) printing system of claim 2 wherein the first partial pressure in the upper chamber is less than 0.02 atmosphere.

4. The three-dimensional (3D) printing system of claim 2 wherein the second partial pressure is less than 0.05 atmosphere.

5. A method of manufacturing a 3D article comprising:
   providing a three-dimensional printing system including:
   a resin vessel including a transparent sheet on a lower side, the transparent sheet having opposed upper and lower surfaces, the resin vessel containing photocurable resin in contact with the upper surface of the transparent sheet;
   a build tray having a lower surface configured to support the 3D article;
   a movement mechanism configured to selectively and vertically position the build tray;
   a light engine configured to transmit modulated light up through the transparent sheet to a build plane within the resin above the transparent sheet;
   a housing that defines two chambers that are fluidically isolated from each other and closed and sealed from a surrounding atmosphere including:
      an upper chamber that is in fluidic communication with the resin contained by the resin vessel; and
      a lower chamber that is in fluid communication with the lower surface of the transparent sheet;
   a gas handling system fluidically coupled to the upper chamber and to the lower chamber;
   operating the gas handling system to reduce and control a partial pressure of the oxygen in the upper and lower chambers with a first partial pressure of oxygen in the upper chamber and a second partial pressure of oxygen in the lower chamber, the second partial pressure is greater than the first partial pressure;
   operating the movement mechanism to position the lower surface of the build tray at the build plane;
   operating the light engine to selectively polymerize a layer of the photocurable resin over the lower surface; and
   repeating operation of the movement mechanism and light engine until the 3D article is formed.

6. The method of claim 5 wherein the second partial pressure is at least twice that of the first partial pressure.

7. The method of claim 6 wherein the first partial pressure in the upper chamber is less than 0.02 atmosphere.

8. The method of claim 6 wherein the second partial pressure is less than 0.05 atmosphere.

9. A non-transient storage system storing software instructions for a three-dimensional (3D) printing system, the printing system including:
   a resin vessel including a transparent sheet on a lower side, the transparent sheet having opposed upper and lower surfaces, the resin vessel configured to contain photocurable resin in contact with the upper surface of the transparent sheet;
   a build tray having a lower surface configured to support the 3D article;
   a movement mechanism configured to selectively and vertically position the build tray;
   a light engine configured to transmit modulated light up through the transparent sheet to a build plane within the resin above the transparent sheet;
   a housing that defines two chambers that are fluidically isolated from each other and closed and sealed from a surrounding atmosphere including:
      an upper chamber that is in fluidic communication with the resin contained by the resin vessel; and
      a lower chamber that is in fluid communication with the lower surface of the transparent sheet;
   a gas handling system fluidically coupled to the upper chamber and to the lower chamber; and
   a controller;
   in response to execution by a processor the software instructions cause the controller to:
      (1) operate the gas handling system to reduce and control a partial pressure of oxygen in the upper and lower chambers with a first partial pressure of oxygen in the upper chamber and a second partial pressure of oxygen in the lower chamber, the second partial pressure is greater than the first partial pressure;
      (2) operate the movement mechanism to position the lower surface of the build tray at the build plane;
      (3) operate the light engine to selectively polymerize a layer of the photocurable resin over the lower surface; and
      (4) repeat (2) and (3) until the 3D article is formed.

10. The non-transient storage system of claim 9 wherein the second partial pressure is at least twice that of the first partial pressure.

11. The non-transient storage system of claim 10 wherein the first partial pressure in the upper chamber is less than 0.02 atmosphere.

12. The non-transient storage system of claim 10 wherein the second partial pressure is less than 0.05 atmosphere.

* * * * *